F. M. CARROLL.
SALES SLIP PERFORATING CASH REGISTER.
APPLICATION FILED SEPT. 15, 1913.
1,191,154.
Patented July 18, 1916.
10 SHEETS—SHEET 1.
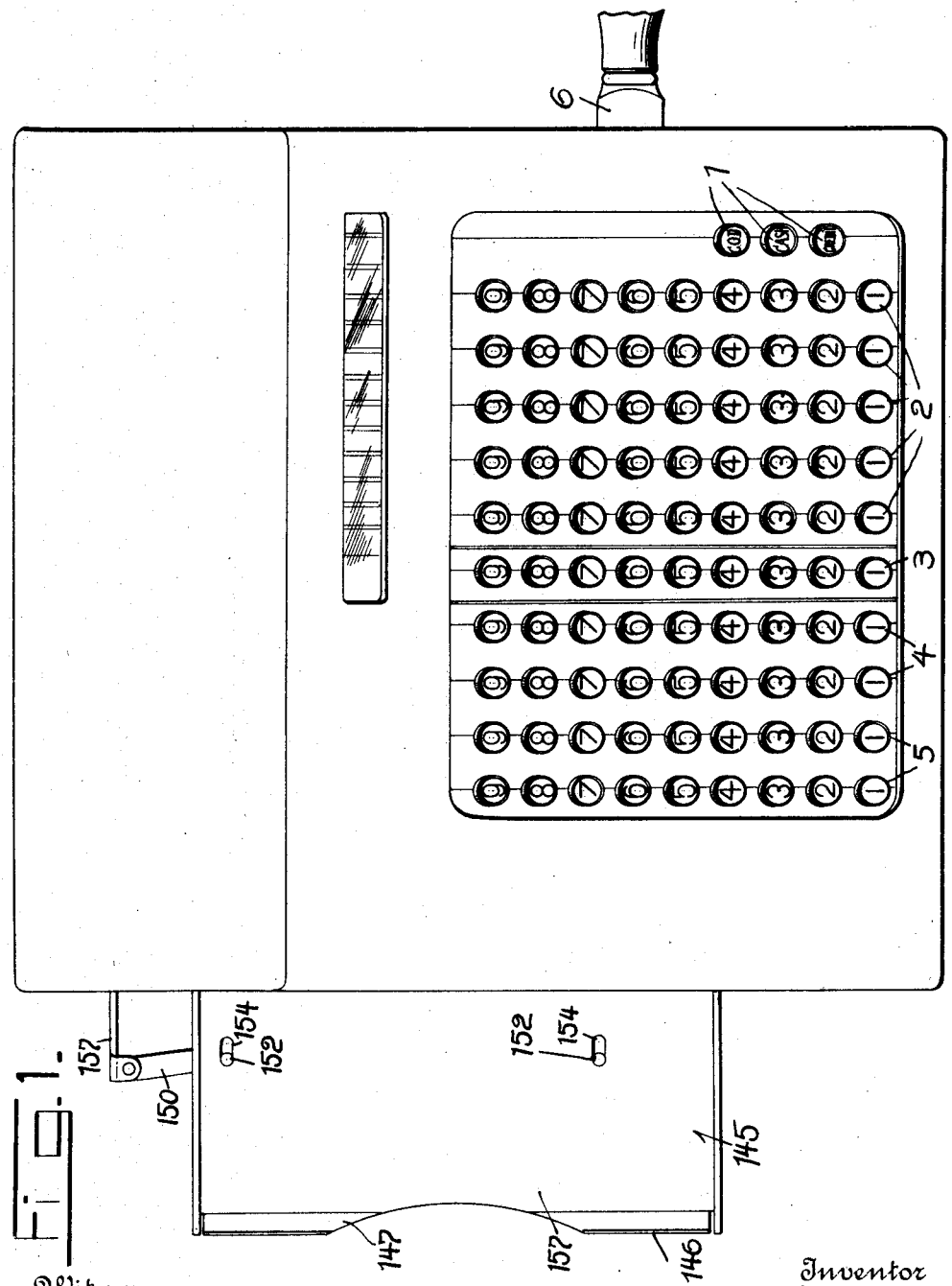

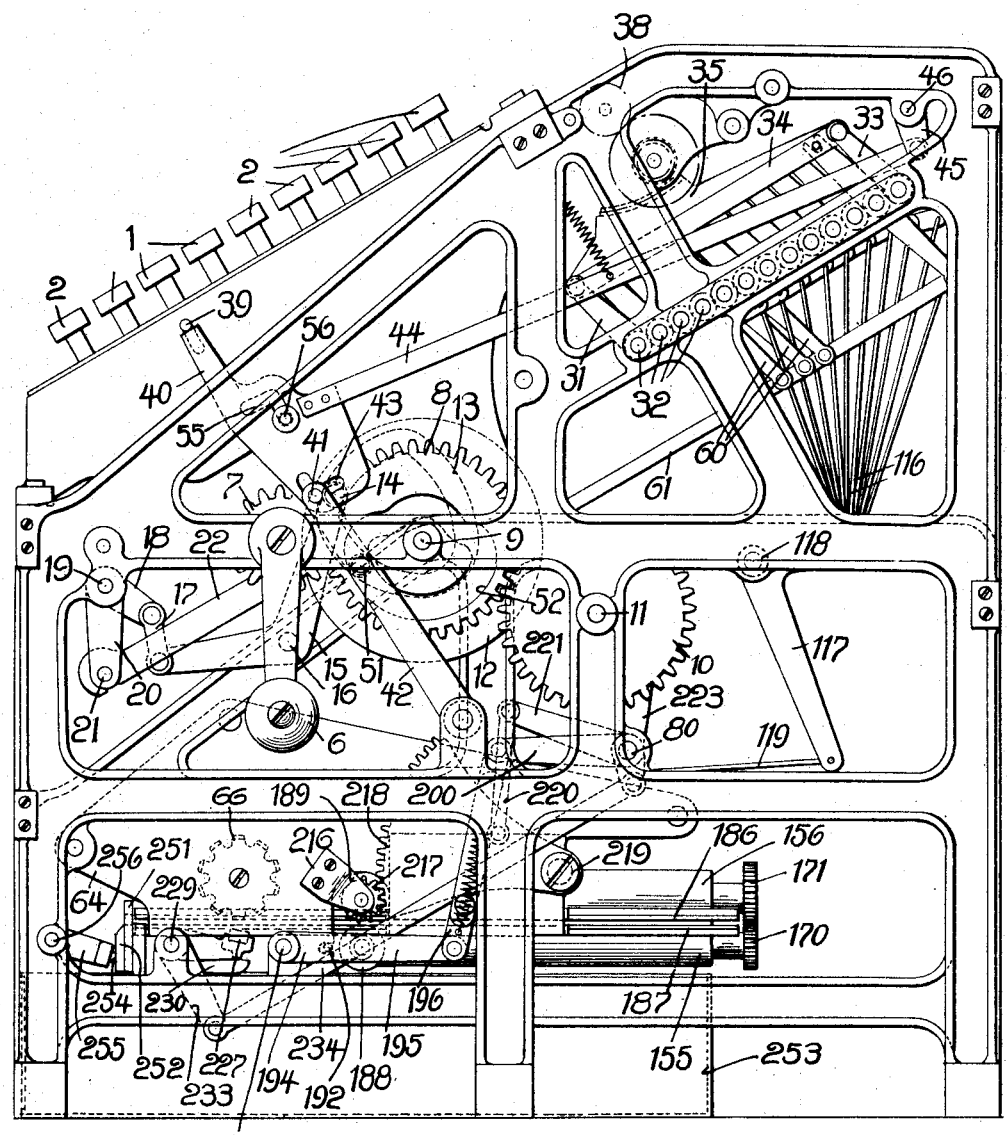

F. M. CARROLL.
SALES SLIP PERFORATING CASH REGISTER.
APPLICATION FILED SEPT. 15, 1913.
1,191,154.
Patented July 18, 1916.
10 SHEETS—SHEET 3.
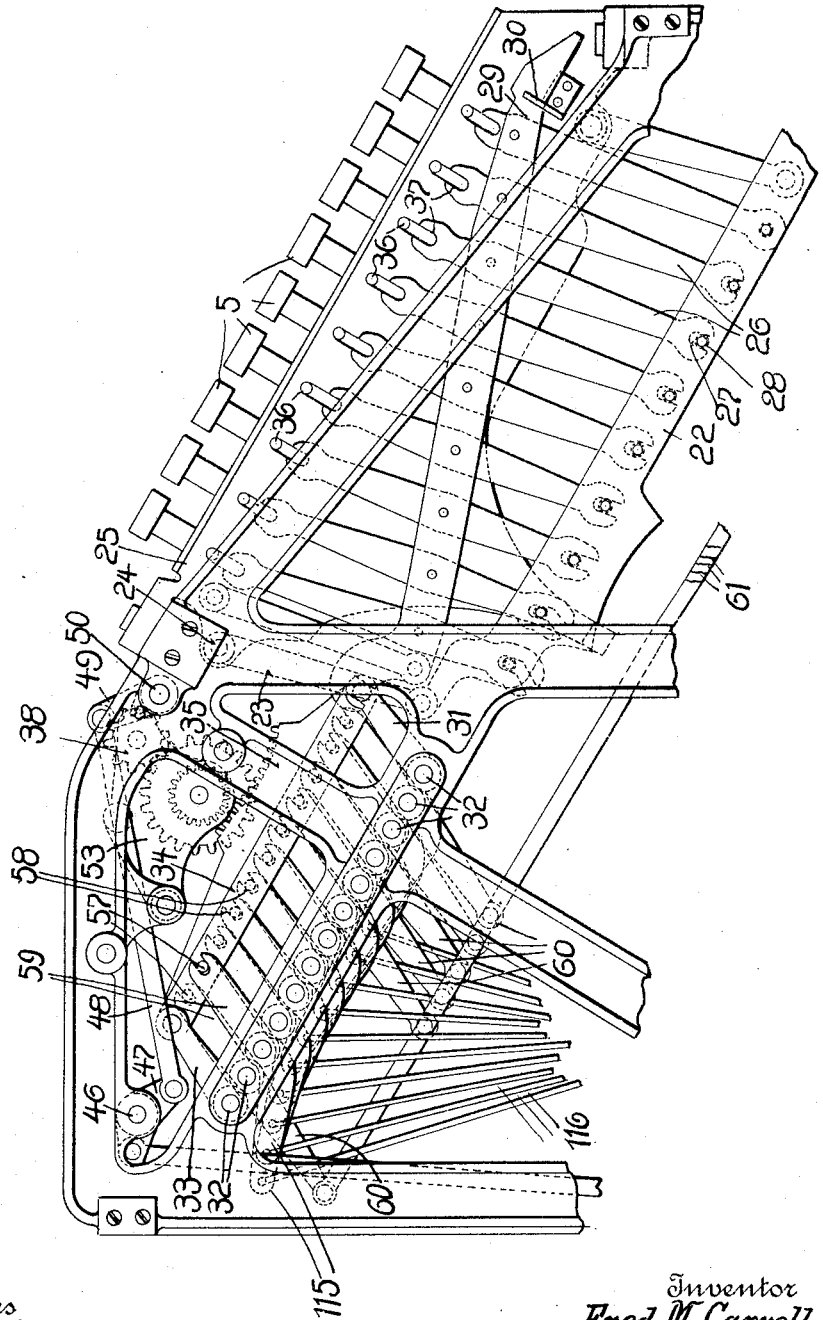

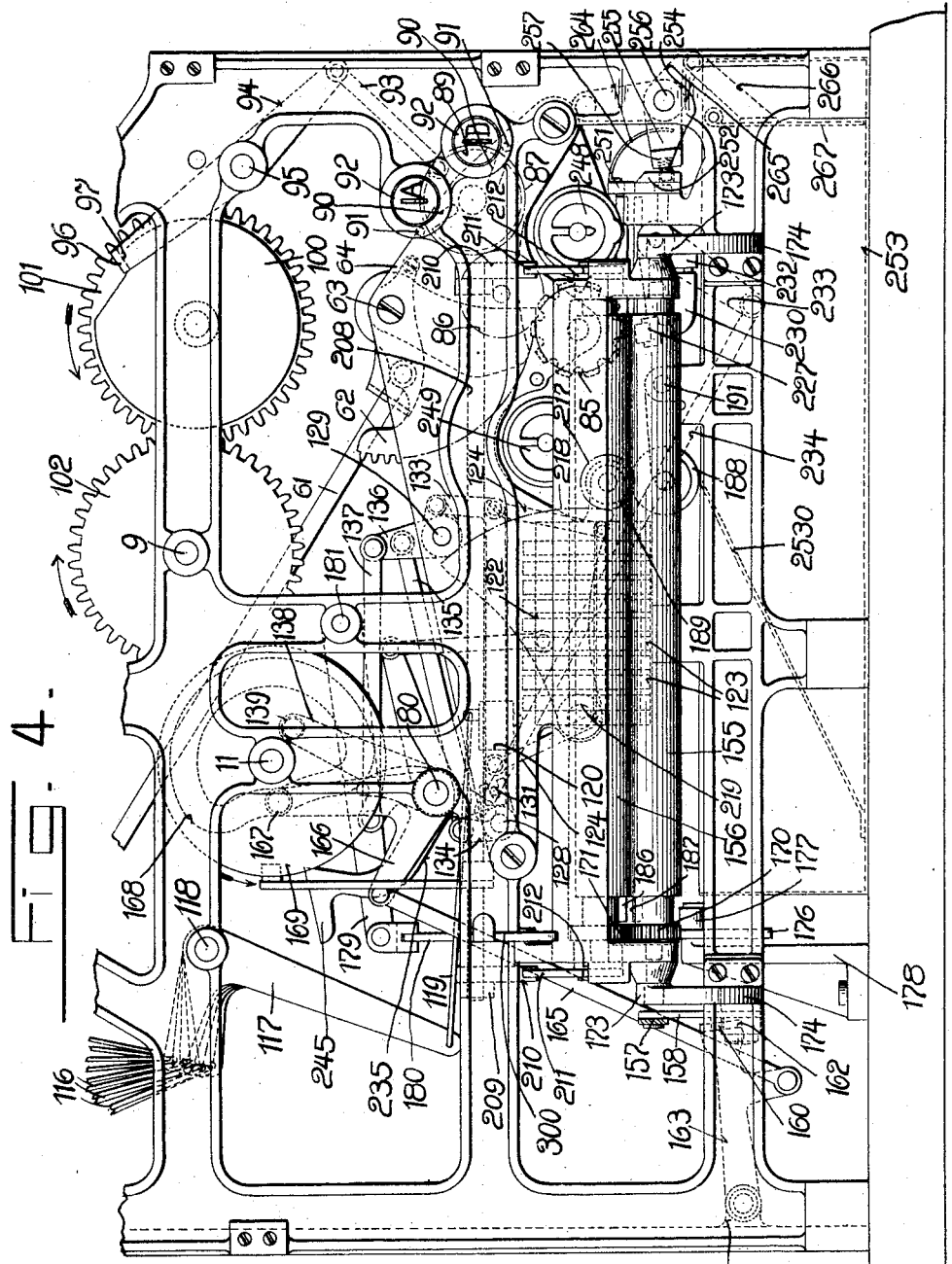

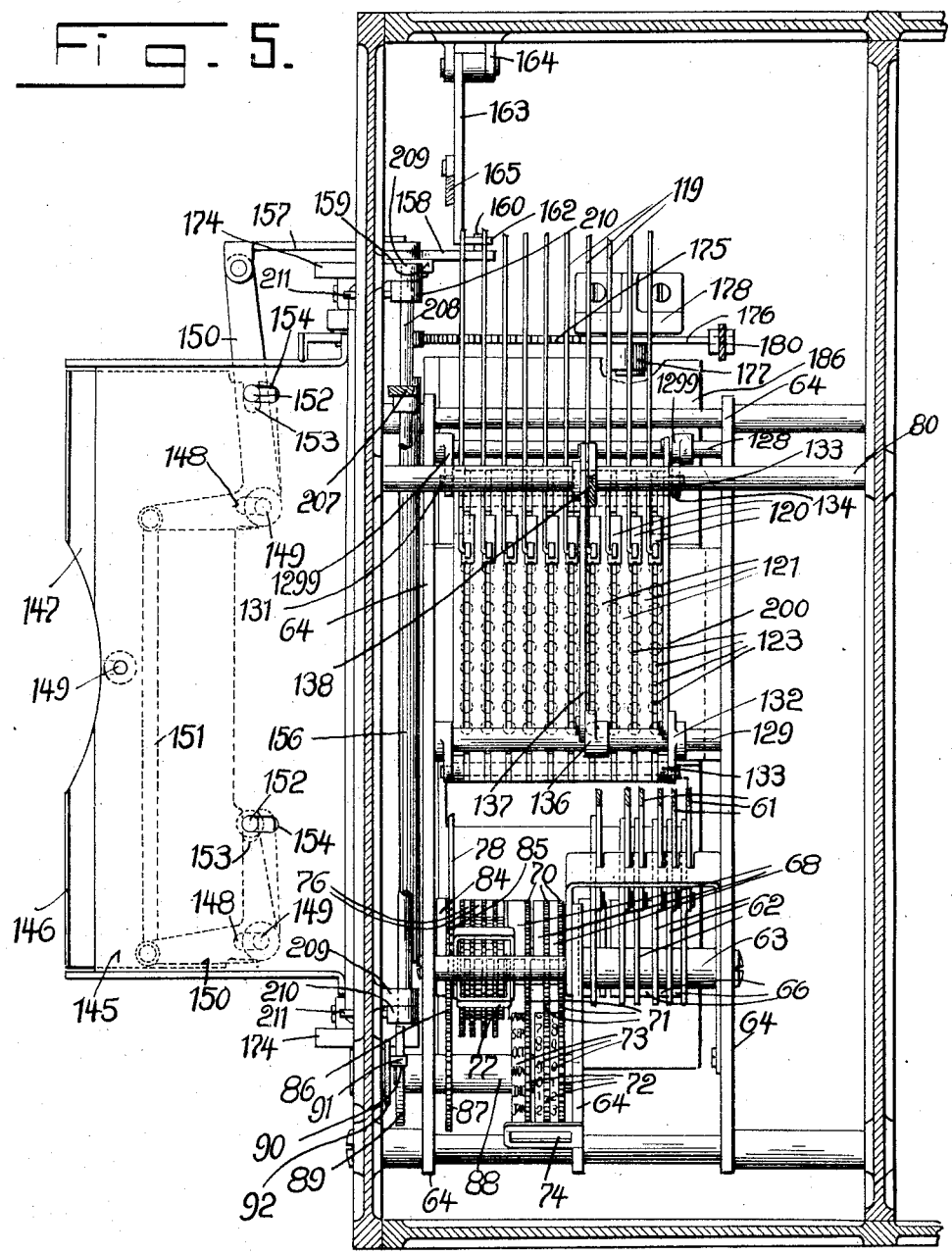

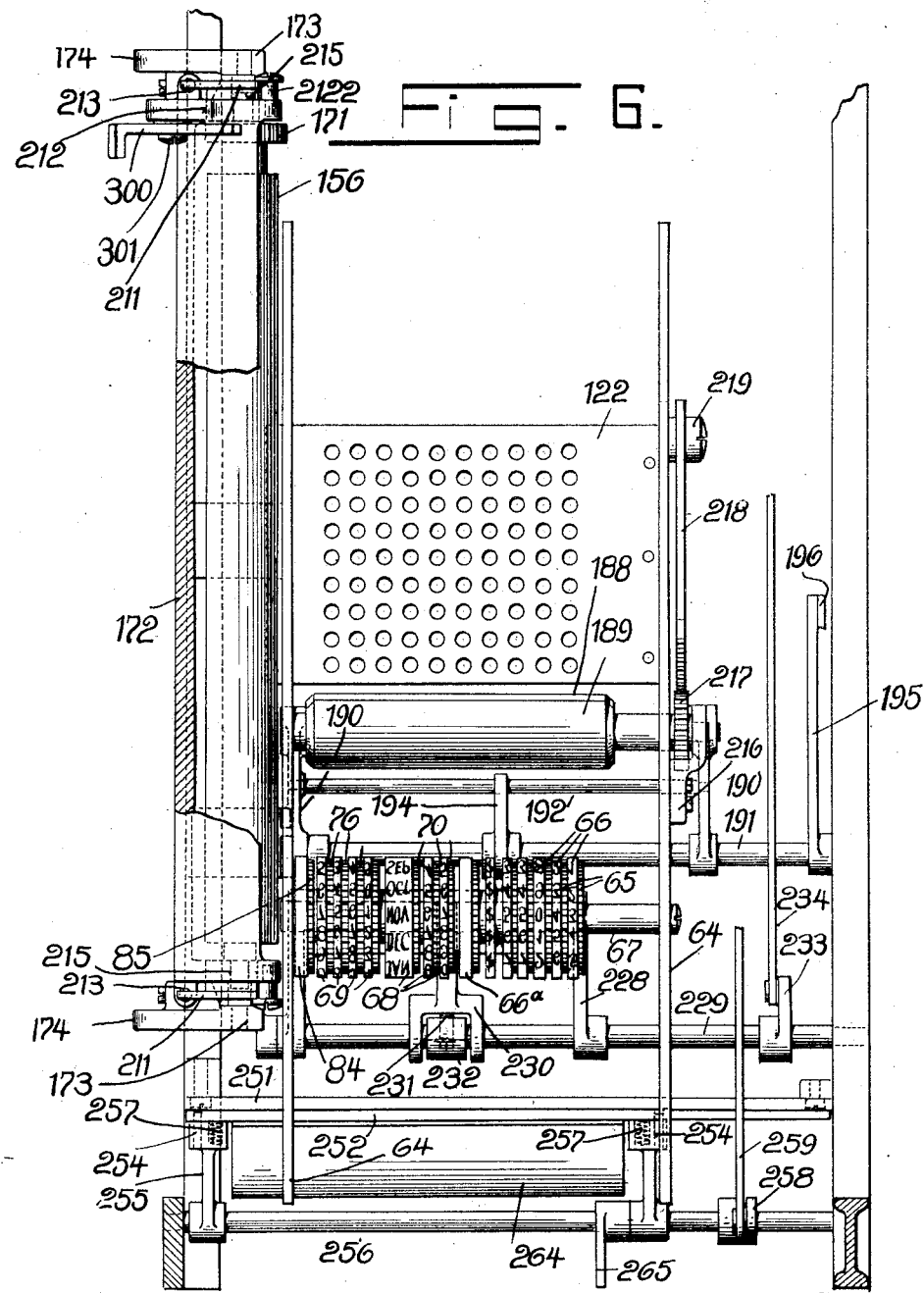

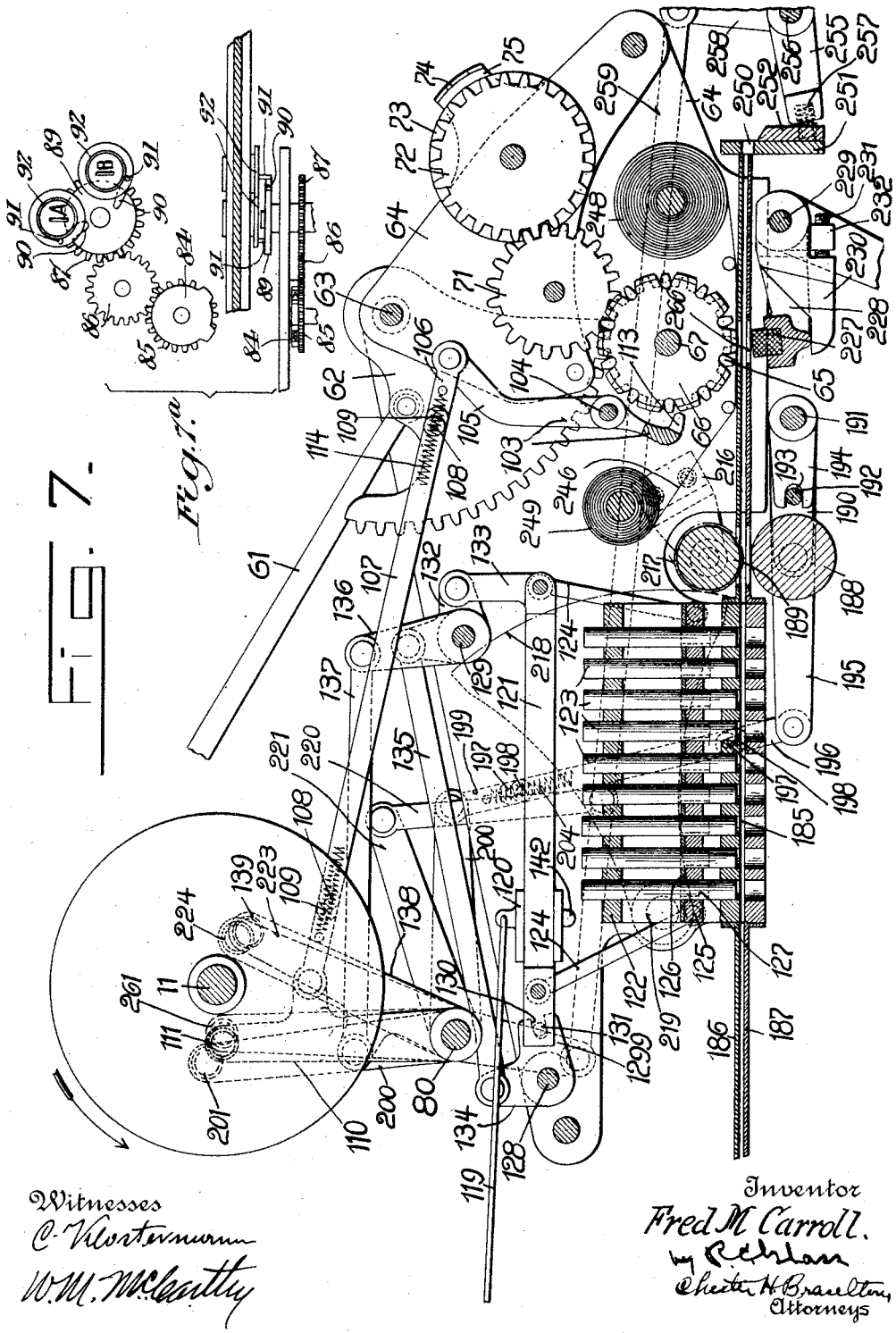

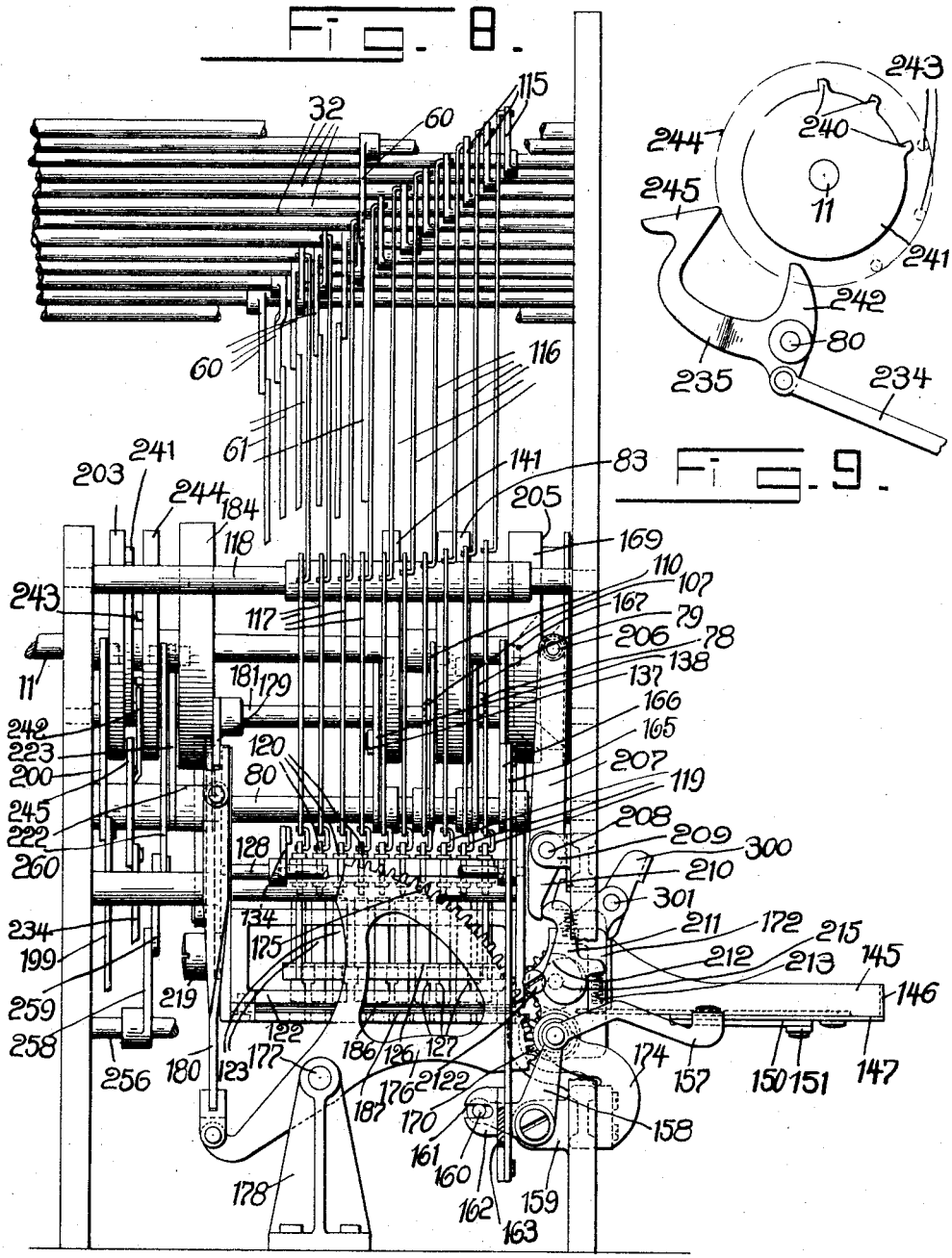

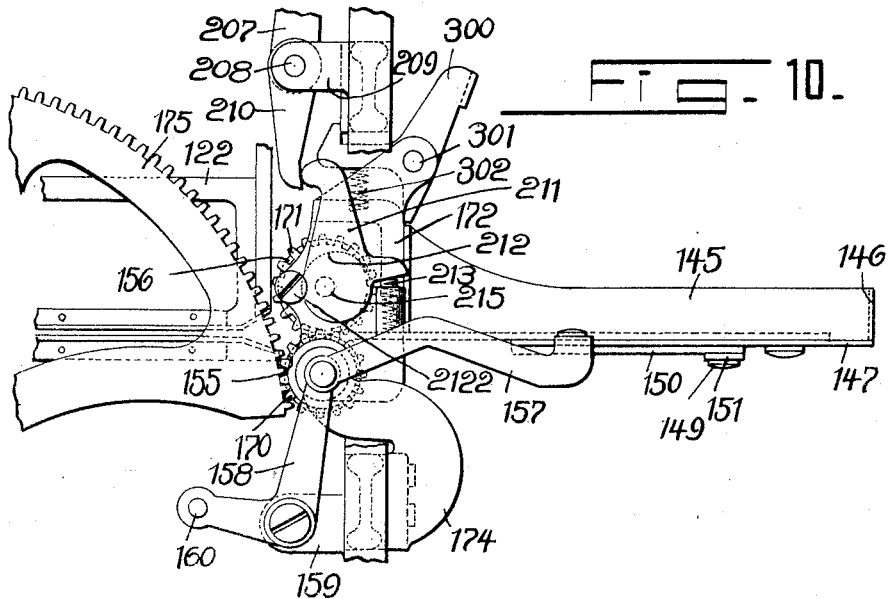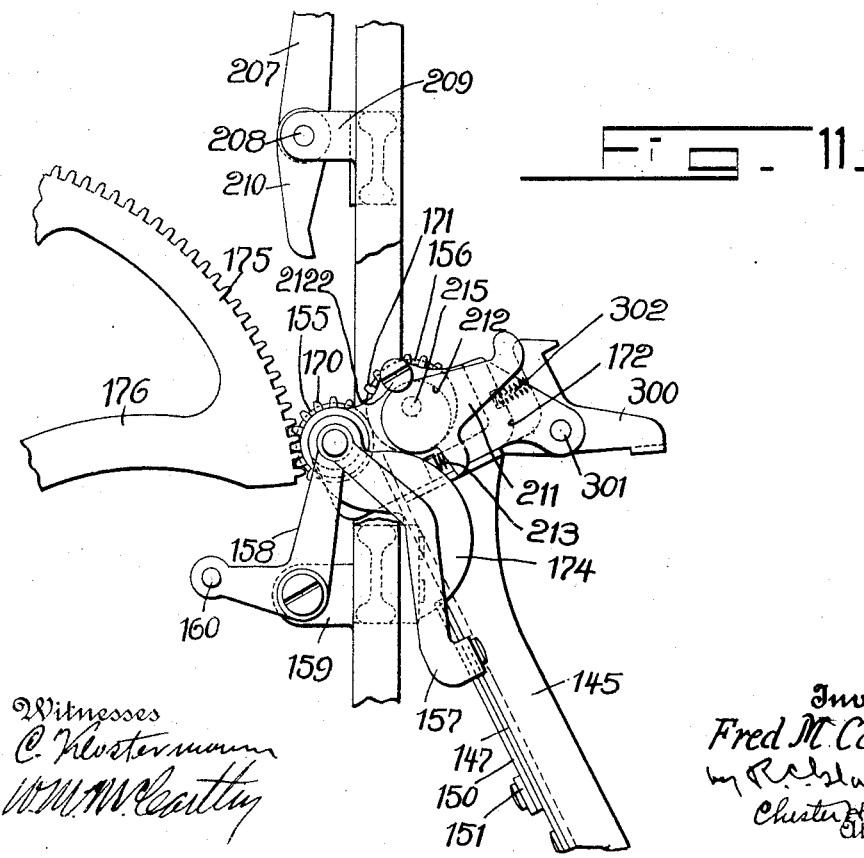

F. M. CARROLL.
SALES SLIP PERFORATING CASH REGISTER.
APPLICATION FILED SEPT. 15, 1913.
1,191,154.
Patented July 18, 1916.
10 SHEETS—SHEET 10.
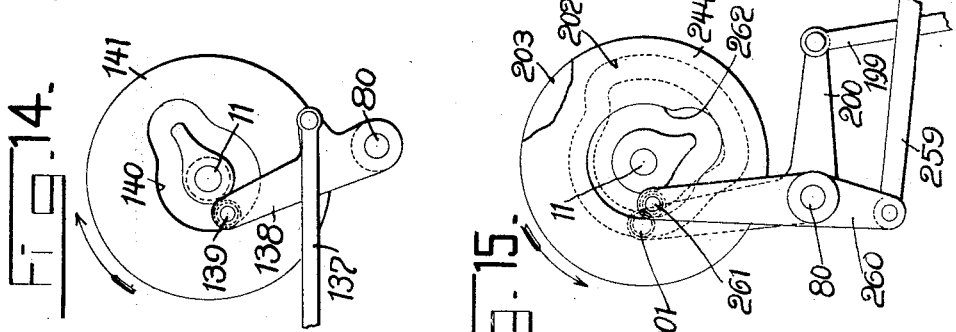
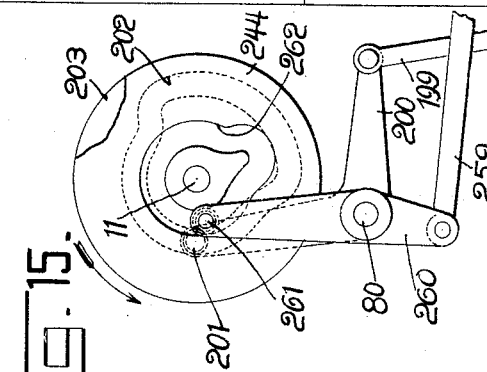
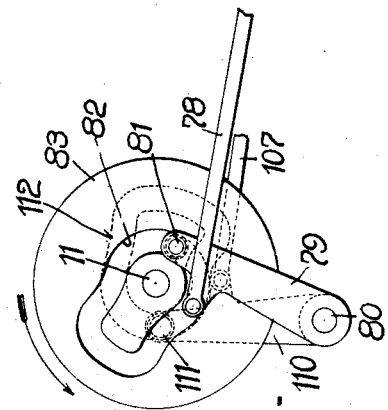
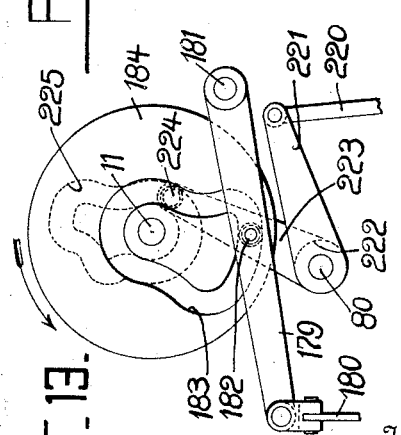
Witnesses
Inventor
Fred M Carroll

UNITED STATES PATENT OFFICE.

FRED M. CARROLL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

SALES-SLIP-PERFORATING CASH-REGISTER.

1,191,154.  Specification of Letters Patent.  Patented July 18, 1916.

Application filed September 15, 1913. Serial No. 789,832.

*To all whom it may concern:*

Be it known that I, FRED M. CARROLL, a citizen of the United States, residing at Dayton, in the county of Montgomery and State of Ohio, have invented certain new and useful Improvements in Sales-Slip-Perforating Cash-Registers, of which I declare the following to be a full, clear, and exact description.

In application No. 773,943, filed June 16, 1913, by the present applicant there is shown a machine designed primarily for use in large commercial establishments, such as department stores, which machine is arranged to print upon a sales slip symbols designating the cashier operating the machine, the consecutive number of the sale, the date and the amount of the transaction. This machine is also provided with a record strip upon which is recorded the same information which is recorded upon the sales slip and in addition thereto has characters perforated therein symbolical of the amount of the transaction, the number of the clerk making the sale and the department in which the clerk is employed.

It is the principal object of this invention to do away with the record strip as disclosed in the above mentioned application and so combine the printing and perforating mechanisms that in addition to printing upon the sales slip, characters will be perforated thereon symbolical of the amount of the transaction, the department in which it is made, the station where the machine is located and the number of the clerk making the sale, which perforated characters are arranged to control subsequent accounting operations.

A further object of this machine is to provide a novel form of feeding mechanism for the sales slip whereby the slip is fed in one direction to the punching devices and at right angles thereto to the printing mechanism.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a top plan view of the improved machine. Fig. 2 is a right hand side elevation of the machine. Fig. 3 is a left hand side elevation of the upper portion of the improved machine. Fig. 4 is a left hand side elevation of the lower portion of the machine. Fig. 5 is a top plan view of the punching devices and the means for feeding the sales slip thereto. Fig. 6 is a top plan view of the recording mechanism and means for feeding the sales slip thereto. Fig. 7 is an enlarged sectional view through the punching devices and the recording means. Fig. 7$^a$ comprises two detail views, one of which is a side view of the clerk's type carrier and means for positioning it while the other is a bottom plan view of the same. Fig. 8 is a rear elevation of the portion of the machine showing the actuating means for the primary set of feed rollers. Fig. 9 is a detail view of the operating cams for the impression means. Fig. 10 is a view of the slip receptacle and the devices for feeding the slip from the receptacle to the perforating means. Fig. 11 is a view of the devices shown in Fig. 10 with the slip receptacle tilted to permit access to certain portions of the recording mechanism. Fig. 12 is a detail view of the cams for operating the consecutive numbering devices and the alining mechanism for the recording means. Fig. 13 is a detail view of the cams operating the primary and secondary feed rollers. Fig. 14 is a detail view of the cams for operating the perforating devices. Fig. 15 is a detail view of the cams for operating the severing mechanism for the sales slip and also for establishing coöperative relation between the secondary feed rolls. Fig. 16 illustrate views of the sales slip.

Described in general terms the machine is provided with a series of banks of keys representing transactions, amounts, departments, stations and clerks. Upon the depressing of the keys in these different banks and actuating the operating handle, the amount represented by the amount keys depressed will be entered upon the totalizer if it is a "cash" sale and also set up devices for punching symbols out of the sales slip representing the clerk's number, the station where the machine is located, the department in which the sale is made and the amount of the sale. These keys also control devices for recording the amount in triplicate upon the sales slip. Prior to the depressing of the keys the sales slip comprising an original and a duplicate portion is placed in a receptacle and as the operating handle is actuated, the slip is fed first in one direction to be brought into coöperative relation with the punching devices and after having suitable characters perforated thereon the slip is fed into coöperative relation with the recording means where several impressions are taken upon the sales slip, after which a portion of the slip containing one of the impressions is severed and deposited in a receptacle within the machine, the remainder of the slip being fed back to the receptacle in which it was first placed. The original and duplicate portion of this slip is then detached, the duplicate portion being wrapped with the goods purchased, while the original is retained by the cashier to be used at the end of the day with the other sales slips for the purpose of auditing the sales made by the clerks under the supervision of this particular cashier.

As shown in Fig. 1 of the drawings, the machine is provided with eleven banks of keys, the first bank to the right comprising three keys 1 representing "C. O. D.", "cash", and "credit" transactions. The next five banks of keys 2 represents amounts, while the last five forming a composite number comprise department keys 3, station number keys 4 and clerk number keys 5 by which composite number the department in which the sale is made, the station where the machine is located and the clerk making the sale may be identified readily. The special transaction keys control the release of the operating handle 6 in a manner fully shown and described in the aforementioned application but which is thought not necessary to illustrate here as it forms no part of the present invention. This operating handle 6 is provided with a pinion 7 (Fig. 2) which meshes with a gear 8 secured to a shaft 9 extending through the machine, and this gear 8 meshes with a similar gear 10 secured to a shaft 11, which also extends through the machine.

Secured to the shaft 9 to which is also secured the gear 8, as previously mentioned, is a disk 12 which is provided with cam groove 13. In this cam groove projects a roller 14 extending from the upper end of a vertical member of the bell crank 15 which is pivoted as at 16 to the right hand side frame. The horizontal arm of the bell crank 15 is connected by a link 17 to an arm 18 secured to a transverse shaft 19. Extending downwardly from each end of this shaft 19 is an arm 20, which arms are connected at their lower ends by a cross rod 21. A series of driving elements 22 are connected to the rod at the forward ends and at the rearward ends are connected by links 23, Fig. 3, which links at their upper ends are fastened as at 24 to their respective frames 25 which support the various banks of keys. From this brief description it will be seen that the bell crank 15 will first be oscillated in a clockwise direction by the cam disk 12, and then back to normal position, by which movement through links 17 and arm 18, it will rock the frame comprising the side arms 20 and cross rod 21, first in an anticlockwise direction, Fig. 2, and then in a clockwise direction. This movement of the frame 20 will be imparted to the driving elements 22 which movement will be a constant one at each operation of the machine. Coöperating with each bank of keys is a series of levers 26, Fig. 3, the lower end of each lever being connected by a slot and pin connection 27 and 28 with its respective driving element 22. The upper ends of said levers 26 are normally free while at an intermediate point between their ends said levers are pivoted to driven members 29, the forward end of each of said members being guided by a lug 30 projecting from its respective key frame 25 while the rearward end of said driven member is connected to the upper end of an arm 31 loosely mounted upon the foremost one of a series of transverse shafts 32. The arm 31 has a companion arm 33 mounted upon the rearmost shaft 32 of the previously mentioned series of transverse shafts and is connected thereto by a link 34. It is to be understood that there is one of the driven members 29 and its connections for each bank of keys, the links 34 coöperating with the driven members 29 controlled by the amount banks of keys being provided with rack portions 35 which drive the totalizer elements extents determined by the keys depressed. In the banks in which no keys are depressed, the levers 26 will rock idly about their pivotal points but in the banks in which keys are depressed, the key pins 36 will enter in the slots 37 formed in the upper end of the levers and act as fulcrums for the levers which will cause a differential movement to be imparted to the driven members 29 owing to the different locations of the pivotal points of the levers 26 on the driven members 29.

The totalizer 38 is normally out of engagement with the actuating racks 35 of the links 34 controlled by the amount keys and is brought into operative relation therewith under the control of the "cash" key. When this last mentioned key is depressed, its pin 39 (Fig. 2) contacts with the upper end of a plate 40 and will lower said plate, by which movement a pin 41 carried by the upper end of an arm 42 will enter the vertical portion of an L-shaped slot 43 formed in the lower part of said plate 40. This plate 40 has secured to its upper end a link 44 which is connected at its other end to an arm 45 secured to a shaft 46. This latter shaft 46 has extending downwardly therefrom an arm 47 (Fig. 3) to which the rearward end of a link 48 is connected, the forward end of said link being secured to an arm 49 secured to a rock shaft 50. The arm 42 (Fig. 2) at an intermediate point is provided with a roller 51 which plays in a cam slot 52 formed in the previously mentioned gear 8. The shape of this cam slot is such that upon the beginning of the operation of the machine the arm 42 will be rocked in a clockwise direction and through the pin 41 engaging the walls of the vertical portion of the L-shaped slot 43 move said plate rearwardly and through the above described connections rock the shaft 46 in an anticlockwise direction (Fig. 2) and the shaft 50 (Fig. 3) in a similar direction, by which means the frame 53 carrying the totalizer will be rocked into engagement with the rack portion 35 of the links 34 controlled by the amount banks of keys. This differential movement of the driven members 29 and the construction of the mechanism for rocking the totalizer in engagement with the actuating racks are fully described and shown in the aforementioned application and if any further description of same is needed reference may be had to the same application. It will be noted from Fig. 2 that the C. O. D. and credit keys, when depressed will not actuate the plate 40, consequently when the arm 42 is rocked by the cam groove 52, when either of these keys is depressed the pin 41 carried by said arm will play idly in the horizontal portion of the L-shaped slot. This plate 40 is also provided with an inverted L-shaped slot 55 through which a pin 56 extends into the frame work for the purpose of guiding the said plate upon the frame work.

Each of the links 34 actuated by the driven members 29 is provided with a pin 57 that plays in a slot 58 formed in the upper end of an arm 59 which is secured at its lower end to one of the transverse shafts 32 intermediate the end shafts from which it will be seen that the differential movement given to the driven members 29 under control of the depressed keys will be conveyed to the shafts 32. The second, third, fourth, fifth and sixth shafts from the front of the machine, which shafts are controlled by the amount keys 2 have extending downwardly therefrom arms 60, which arms at their lower ends are connected to links 61 (Fig. 3) the foremost ends of the latter being connected to segments 62 (Fig. 7) which are pivotally mounted on a rod 63 supported by the frame work 64 carrying the recording means. The special bank of keys 1 controls the second rearmost shaft 32 and this shaft has an arm 60 extending downwardly therefrom which is connected by a link to one of the segments 62. The segments 62 mesh with gears 65 (Figs. 5, 6 and 7) which gears are secured to type wheels 66 for recording the class of transaction and the amount thereof upon the sales slip. From this description it will be seen that these type carriers will be differentially adjusted in accordance with the amount and special keys depressed. These type carriers are loosely mounted upon a transverse rod 67 supported by the frame 64 and mounted upon this rod adjacent to these type carriers are type carriers 68 for printing the month and day and type carriers 69 for recording the consecutive number of the sales. The type carriers 68 for recording the month and day of the sale are provided with gears 70 which mesh with idlers 71 (Fig. 7) the latter in turn meshing with gears 72 secured to disks 73 which indicate through an opening 74 in the plate 75 the month and day that is in printing position.

The consecutive numbering wheels 69 are provided with ratchets 76, Fig. 6, which are arranged to be engaged by a well known form of multiprong pawl carried by a yoke 77 (Fig. 5) which yoke is connected by a link 78 to an arm 79 (Fig. 12) which arm is pivoted as at 80 to the frame work of the machine and at its free end is provided with a roller 81 that plays in a cam groove 82 formed in the disk 83 secured to a previously described shaft 11, which shaft is given a complete rotation at each operation of the machine. By this construction the yoke 77 will be reciprocated at each operation and by the well known multiprong pawl the units wheel of the consecutive numbering device will be advanced one step, the transfer between the different wheels of the consecutive numbering device being made by the actuating pawl of the wheel that has made a complete rotation dropping in a deep notch permitting the prong of the pawl to coöperate with the wheel of the next higher order to engage said wheel and advance it one step. Mounted loosely upon the shaft 67 and adjacent to the consecutive numbering wheels 69 is a type wheel 84 which bears the characters A and B for designating the cashier operating the machine. This type wheel has secured thereto a gear wheel 85 which meshes with an idler 86 that in turn meshes with a gear 87 secured to a sleeve 88 (Figs. 4 and 5) the pitch lines of the gears 85, 86 and 87, only being shown in Fig. 4. This sleeve 88 carrying the gear 87 is suitably supported by the printer frame work 64 and at its outer end has secured thereto a disk 89 provided with slots 90 into which pins 91 projecting from the lock barrels 92 of the A and B locks Fig. 4 are arranged to enter when said locks are rotated and by this means rotate the disk 89. As the pins 91 projecting from the lock barrels 92 actuate the disk 89 in opposite directions, it will be seen that through the gears 85, 86 and 87 the cashier's type carrier 84 will be rotated in opposite directions to bring either the A or B characters thereon in position to record the proper character. The disk 89 has secured thereto one end of a link 93, the other end of which is secured to a lever 94 the latter being pivoted at 95 upon the left hand side frame of the machine. The free end of the lever 94 is provided with a flange 96 which engages with a shoulder 97 formed upon a disk 100 secured to a gear 101 suitably mounted upon the left hand side frame. This gear 101 meshes with a similar gear 102 secured to the before mentioned shaft 9 which shaft is given a complete rotation during each operation of the machine. With the parts in the position shown in Fig. 4, it will be seen that the shaft 9 and consequently the operating handle 6 will be locked from operation regardless of the keys depressed but when the disk 89 is rotated by the operation of either the A and B locks the lever 94 will be rocked in a clockwise direction (Fig. 4) carrying the flange 96 from engagement with the shoulder 97 thereby leaving the machine free to be operated upon the depressing of the keys: With this locking arrangement under control of the cashier it will be obvious that during the absence of both cashiers that the machine will be locked to prevent tampering therewith or fraudulent operation thereof.

A frame 103, (Fig. 7) is pivotally mounted upon a rod 104 supported by the recording frame work 64. This frame 103 has extending upwardly therefrom an arm 105 to which is connected one end of a link 106, the latter being mounted slidably upon a link 107 by pins 108 which pass through the elongated slots 109 formed in the link 107. The rearward end of the link 107 is connected to an arm 110 (Fig. 12) which arm is pivoted upon the stud 80 at its lower end and at its upper end is provided with a roller 111 which plays in the cam slot 112 formed in the disk 83 upon the opposite side from that in which cam disk 82 is formed. The frame 103 is provided with alining teeth 113 which as the frame is rocked by the cam disk 112 engage with teeth of the gears secured to the aforementioned printing wheels and thereby aline said wheels. A spring 114 connects the slides 106 and 107 so that in case one of the teeth 113 of alining frame 103 contacts with the outer edge of one of the teeth of the wheels connected to the type carriers, the slide 107 would nevertheless receive its full degree of movement by the cam slot 112 without injury to the mechanism of the machine due to the fact of the elongated slot and pin connection with the slide 106. If the wheels are in proper printing position or nearly so the alining teeth 113 will be caused to enter between the teeth of the wheels connected to the type carrier by the spring 114 connecting the slides 106 and 107 and thereby properly aline said type carriers.

The mechanism for perforating the sales slips with characters symbolical of the amount and kind of transaction as well as the clerk making the sale, the department in which it is made and the station where the machine is located will now be described.

All of the shafts 32 that are under control of the various banks of keys with the exception of the shaft which is controlled by the transaction bank of keys have extending therefrom arms 115 each one of which at its rear end is connected to the upper end of a rod 116 (Fig. 3) the lower end of the latter being connected to horizontal members of bell crank levers 117, Fig. 4, which are pivoted upon a stud 118 projecting from the left hand side frame of the machine. The lower ends of the vertical members of the bell cranks 117 are connected to the rearward end of rods 119 which at their forward ends are connected to plates 120, (Figs. 5 and 7) slidably mounted in a movable frame 121. Immediately below the frame 121 there is a stationary perforated frame work 122 in which is mounted a series of punches 123, there being one of these punches for each key on the keyboard with the exception of the special transaction keys. Extending downwardly from the movable frame 121 are links 124 to the lower ends of which are secured a perforated plate 125 through which the punches 123 extend. This plate has secured to the upper edge thereof a thin perforated plate 126, the edges of which perforations extend into elongated notches 127 formed in the sides of the punches 123 and normally hold said punches in the position shown in Fig. 7. Transverse shafts 128 and 129 are mounted in the printer frame work 64 and near each end of the shaft 128 is mounted a forwardly extending arm 129 which is provided with an elongated slot 130 into which pins 131 projecting from the movable frame 121 enter. The shaft 129 has also extending forwardly therefrom arms 132 to which are connected the upper ends of uprights 133 extending from the movable frame 121. The right hand ones of the arms 132 and 134 are bell crank in form and the vertical members thereof are connected by links 135 so a movement of one of said arms will be conveyed to the other one. The shaft 129 has extending upwardly from near its center an arm 136 to which is secured one end of a link 137, the other end of which link is connected to an arm 138 which is pivotally mounted upon the shaft 80. This arm 138 carries at its upper end a roller 139 (Figs. 7 and 14) which plays in a cam slot 140 formed in the disk 141 secured to one of the main operating shafts 11. The shape of this cam groove 140 is such that during each operation of the machine the arm 138 is reciprocated and through link 137 and arm 136 rocks the shaft 129, this shaft 129 having secured thereto the arms 132, which through the link connection 135 rocks the shaft 128, the shafts 128 and 129 being thus rocked will cause the lowering of the frame 121. This lowering of the frame 121 will carry the plates 120 slidably mounted therein, which plates it is to be understood have been previously adjusted by the rocking of the shafts 32 and connections therefrom so as to bring projections 142 extending downwardly from said plates into contact with the proper plungers 123 and force said plungers through the sales slip 144 which has been previously brought into coöperative relation with the plungers as hereinafter described, so as to punch out of said sales slip characters symbolical of the amount of the transaction, the department in which the transaction is made, the station at which the machine is located and the number of the clerk making the sale. With the lowering of the frame 121 and the slides 120 carried thereby, the perforated plates 125 and 126 connected to said movable frame 121 by the links 124 will permit the lowering by gravity of all of the plungers 123. The plungers 123 that are not to be operated by the projections 142 of the slides 120 will be arrested by contacting with the sales slip whereas those that are to be operated will be forced through the sales slip by the projections 142 of the slides 120. After the sales slip 144 has been perforated, the movable frame 121 will be elevated by the cam disk 141 and the plate 126 will contact with the shoulders formed by the upper edges of the notches 127 formed in the plungers 123 and restore said plungers to their normal position, as shown in Fig. 7. The pieces punched out of the sales slip will be deposited in the rear part of a receptacle 253 which is divided by an inclined partition 2530 (Fig. 4).

Previous to the operation of the machine, the sales slip is placed in a receptacle on the side of the machine and upon the operation of said machine the slip will move laterally in position to have the punching device operate thereupon at which time an impression is also taken upon the duplicate portion of the sales slip. After this the sales slip is intermittently fed forwardly and a second impression taken upon the duplicate portion of said slip and finally a third impression taken upon the original. During the taking of this third impression the severing mechanism is operated which severs that portion of the slip containing the first impression and deposits it into a receptacle located within the machine. The feeding devices for the sales slip are then reversed and the slip fed rearwardly and then laterally out into the slip receptacle in which position it is accessible to the cashier. She then separates the original part from the duplicate and places the duplicate with the goods and retains the original for auditing purposes. This mechanism for feeding the sales slip will now be described.

The sales slip 144 (Fig. 16) is placed within a receptacle 145 (Figs. 1, 5, 8, 10 and 11) with its outer edge abutting against the flange 146 of a plate 147. This plate 147 is provided with elongated slots 148 through which extend pins 149 projecting from the under side of the receptacle 145 thereby guiding said plate upon the under side of the receptacle. Pivotally mounted upon two of the pins 149 are bell cranks 150 which are connected by a link 151. These bell cranks are provided with pins 152 which extend into recesses 153 formed in the plate 147 and through elongated slots 154 formed in the receptacle 145. At the beginning of operation of the machine the bell cranks are rocked in a clockwise direction which will cause the plate 147 to move to the right (Fig. 5) and the flange 146 thereof abutting the outer edge of the sales slip 144 will cause said slip to move in a similar direction and to be gripped by feed rollers 155 and 156. This movement of the plate 147 is brought about in the following manner. Connected to one member of one of the bell cranks 150 is a link 157 (Figs. 4, 5, 8, 10 and 11) which link at its inner end is connected to a vertical member of a bell crank 158. This bell crank 158 is pivoted to a bracket 159 and the horizontal member of said bell crank is provided with a pin 160 which enters into a recess 161 formed in a flange 162 extending from an arm 163 which is pivoted to brackets 164 projecting from the rear frame of the machine, (Figs. 4 and 5). A link 165 connects the arm 163 with one member of a bell crank 166 (Fig. 4) which is pivoted upon the shaft 80, the other member of said bell crank being provided with a roller 167 that plays in a cam groove 168 formed in a disk 169 secured to the aforesaid shaft 11. The shape of the cam groove 168 is such that upon the very beginning of operation of the machine the bell crank 166 will be rocked in an anti-clockwise direction which through the intermediate connections will cause the plate 147 to carry the sales slip into position to be gripped by the before mentioned feed rollers 155 and 156. These feed rollers which comprise the primary set of feed rollers are provided with intermeshing pinions 170 and 171, respectively, (Figs. 4, 8, 10 and 11). These feed rollers and the sales slip receptacle are mounted in a frame 172, which in turn is pivotally mounted upon the bearings 173 (Fig. 4), of the lower feed rollers, which bearings are supported by brackets 174 secured to the left hand side frame. Meshing with the pinions 170 of the lower feed roller 155 is a rack portion 175, Figs. 8, 10 and 11, of a lever 176 which is pivoted as at 177 to an upright 178 extending from the base of the machine. The other end of the lever 176 is connected to an arm 179 (Figs. 8 and 13) by a link 180. The arm 179 is loosely mounted upon a rod 181 and projecting from the center of said arm is a roller 182 which plays in a cam groove 183 formed in a disk 184 secured to the operating shaft 11. The shape of the cam groove 183 is such that after the beginning of operation of the machine the arm 179 will be elevated (Fig. 13) and through the link 180 rock the lever 176 in a clockwise direction (Fig. 8) which through the segmental rack portion 175 causes the lower feed roller 155 to rotate in an anti-clockwise direction and through the gear 170 meshing with the gear 171 rotate the upper feed roller 156 in a clockwise direction. By the rotation of these feed rollers, the sales slip 144 is caused to enter in the recess 185 (Fig. 7) formed in the stationary frame work 122 below the plungers 123 carried by said frame work. Extending forwardly and rearwardly from the frame work 122 are upper and lower guide plates 186 and 187, respectively, which also act as a guide for the sales slip. As the sales slip is thus fed laterally by the rollers 155 and 156 in position to be operated upon by the punching devices 123, the forward edge thereof passes beneath the type carriers 66, 66ª, 68, 69 and 84 for recording respectively the amount of sale, the class of sale, the date, the consecutive number, and the cashier operating the machine. This feeding of the sales slip by the rolls 155 and 156 also carries said slip between rolls 188 and 189 which comprise the secondary pair of feed rolls for the slips, these rolls being normally apart to permit the sales slip to enter between same. Just prior to the operation of the punches 123 and after the slip has been brought into coöperative relation therewith, the secondary feed rolls 188 and 189 are brought together to grip the paper and the primary feed rolls are separated so as not to interfere with the feed of the slip in forward direction to the recording means after the punching devices have been operated, which engagement of the secondary feed rolls and the disengagement of the primary feed rolls will now be described.

The lower feed roll 188 of the secondary pair is supported by arms 190 which are loosely mounted upon a shaft 191 supported by the frame work of the machine (Figs. 6, 7 and 15); the arms 190 are connected by a cross rod 192 which enters into a recess 193 formed in arm 194 secured to the shaft 191. At its right hand end (Fig. 6) this shaft has secured thereto a rearwardly extending arm 195 which is connected to the lower end of a link 196 which in turn is connected by a slot and pin connection 197 and 198 (Fig. 7), with a link 199 secured to the horizontal arm of a bell crank 200 which is loosely mounted upon the rod 80. The vertical member of the bell crank 200 is provided with a roller 201 which plays in a cam groove 202 (Fig. 15) formed in a cam disk 203 secured to the operating shaft 11. A spring 204 is coupled to links 199 and 196. The object of this slot and pin and spring connection between the arms 196 and 199 is to compensate for any wear of the rollers 188 and 189. When the bell crank is operated to cause the lower roll 188 to be elevated into contact with the upper roll 189, the link 199 will be raised. This movement of the link 199 will through the spring 204 elevate the link 196 which will cause the rocking of the shaft 191 and the elevation of the roll 188 into contact with the roll 189. Any further movement of the bell crank 200 and the link 199 connected thereto will simply cause the distending of the spring 204.

The cam disk 169 (Figs. 4 and 8) which is secured to the operating shaft 11 is provided on its surface with a cam groove 205, in which plays a roll 206 secured to the upper end of an arm 207, the lower end of this arm being secured to a shaft 208 which is mounted in brackets 209 projecting inwardly from the left hand side frame of the machine. (Figs. 4, 5 and 8). Extending downwardly from the ends of the shaft 208 are arms 210, the lower ends of which engage with the upper ends of arms 211 having bearings 212 which are mounted in the previously mentioned frame 172 carrying the primary feed rolls 155 and 156. Immediately after the clamping of the sales slip between the secondary feed rolls 188 and 189, the cam groove 205 formed in the disk 169 will rock the arm 207 in an anti-clockwise direction (Fig. 8). This arm being secured to the shaft 208 will cause the arms 210 extending downwardly therefrom to rock in a similar direction, which arms will rock the arms 211 and their bearings 212 in a clockwise direction against the tension of springs 213, which are suitably mounted upon the frame work 172 and abut against extensions 214 of the arms 211. The bearings 212 and the arms 211 which are held in position by screws 2122 extending into the frame 172 eccentrically support bearings 215 of the upper feed rollers 156. From this it is obvious that as the bearings 212 of the arms 211 are rotated in a clockwise direction (Figs. 8 and 10), the bearing 215 of the upper feed roll 156 will be elevated, thereby carrying the said roll out of engagement with the roll 155. This elevation of the upper feed roll is not sufficient to cause the gear 171 secured thereto to unmesh from the gear 170 so that when the parts are restored to their normal position the gears 170 and 171 are insured of proper meshing. After the engagement of the secondary rolls and the disengagement of the primary rolls, the former are intermittently rotated so as to feed the sales slip forwardly to receive a plurality of impressions from the previous mentioned type carriers. This feeding by the secondary rolls is accomplished in the following manner. The upper secondary feed roll 189 is supported at its inner end by a bracket 216 secured to the recording frame 64 (Figs. 2 and 6), and the shaft of this roll has secured thereto a pinion 217 with which meshes a segmental rack plate 218 pivotally mounted upon a stud 219 projecting from the recording frame 64. A link 220 connects the segmental rack plate 218 with an arm 221, which is loosely mounted upon the aforementioned rod 80. This arm 221 is connected by a short sleeve 222 to an upwardly extending arm 223, Fig. 13, which is provided at its upper end with a roller 224 which plays in a cam groove 225 formed in the previously described disk 184 for operating the primary rolls 155 and 156. The shape of the groove 225 is such that the segment 218 (Fig. 2) is partially lowered which causes the secondary feed rolls 188 and 189 to feed the sales slip 144 slightly forwardly after which there is a rest in the cam so that the impression mechanism hereinafter described may be operated to take an impression from the type carriers, which second impression is taken upon the duplicate portion of the sales slip, that portion of said sales slip upon which the first impression was taken is severed, as shown by the broken line in Fig. 16, by mechanism hereinafter described. After the third impression has been taken upon the sales slip, the segmental rack plate 218 is elevated or moved in a clockwise direction (Fig. 2) by the cam groove 225, thereby reversing the rotation of the secondary feed rolls 188 and 189 which causes the sales slip to be fed rearwardly into the position in which it is perforated by the punching device heretofore described. When the sales slip reaches this position, the cam groove 205 (Fig. 8) operates upon the lever 207 so as to permit the springs 213 to rock the arms 211 carrying the primary feed roll 156 so that said roll will be brought into engagement with the feed roll 155 thereby gripping the sales slip. Coincidentally with the gripping of the sales slip by the primary feed rolls the secondary feed rolls will be disengaged by the rocking of the shaft 191 (Fig. 7) which shaft carries arms supporting the lower feed roller 188. This rocking of the shaft is brought about by the intermediate connections consisting of the arm 195, links 196 and 199 and bell crank 200 and cam disk 203 (Fig. 15). After this disengagement of the secondary rolls and the engagement of the primary rolls, the actuating lever 176 for the primary roll is returned to its normal position (Figs. 8, 10 and 13) which causes a reversal of the rotation of said primary rolls thereby feeding the sales slip into the receptacle 145, it being understood that prior to the feeding of this slip into the receptacle 145, the plate 147 mounted thereon will have been returned to its normal position. After the depositing of the slip into the receptacle, the same is taken by the cashier who detaches the original from the duplicate, the latter being wrapped with the goods purchased, while the former is kept by the cashier for the purpose of auditing the transactions that pass through the machine.

As previously mentioned, mechanism is provided for taking a plurality of impressions upon the sales slip, which mechanism will now be described.

The guide strips 186 and 187 for the sales slip (Fig. 7) are provided with openings 266 through which a platen 227 is arranged to pass to take impressions upon the sales slip from the type carriers located just above said platen. This platen 227 is carried by a yoke shaped frame 228 the arms of which are loosely mounted upon a shaft 229 mounted in the frame work of the machine. This shaft has also loosely mounted thereon a lifting frame 230 for the platen, which frame is engaged by a set screw 231 carried by arm 232 secured to and extending downwardly from the shaft 229. Near its right hand end the shaft 229 (Fig. 2) has secured thereto a downwardly extending arm 233 to which is connected the forward end of a link 234, the rear end of the latter being connected to a multiprong pawl 235 (Fig. 9), which pawl is pivoted upon the rod 80. When the sales slip is positioned into coöperative relation with the punching devices by the primary set of feed rolls and is gripped by the secondary feed rolls, at which time the lower part of the duplicate portion of the sales slip is in position to receive an impression from the type carriers, a projection 240 extending from a disk 241 secured to the side of the cam disk 203 engages with a prong 242 of the multiprong pawl 235 and rocks the said pawl in a clockwise direction. This movement of the pawl through link 234 and arm 233 (Figs. 2, 4 and 6) secured to the shaft 229, causes the latter to be rocked in a clockwise direction and through the arm 232 and lifting frame 230 causes the platen to take an impression upon the sales slip from the previously adjusted type carriers. After the taking of this impression, a pin 243 (Figs. 8 and 9) projecting from cam disk 244 will contact with a prong 245 of the pawl 235 and positively return said pawl to its normal position and through the previously described connection permit the return of the platen 227 to its normal position. When the sales slip is fed forwardly by the secondary feed rolls 188 and 189, as previously described, other projections 240 extending from the disk 241 will engage the prong 242 of the pawl 235 and through the intermediate connections cause the platen 227 to take a second impression upon the duplicate portion of the sales slip and a third impression upon the lower portion of the original part of the sales slip. Immediately after the taking of these impressions, pins similar to pins 243 projecting from disks 244 will engage with the prong 245 and positively force the pawl 235 to its normal position and through the connections between said pawl and the platen permit the return of the latter to its normal position, as shown in Fig. 7 of the drawings.

A ribbon 246 is interposed between the type carriers and sales slip for the purpose of making the impression taken from the type carriers more legible. This ribbon 246 is arranged to be fed from a roll 248 to another roll 249 which feed may be automatically reversed by any of the well known feed devices.

In order that access may be had to the ribbon 246, and other mechanism pertaining to the recording means and punching devices, the frame 172 carrying the slip receptacle 145 and the primary feed rolls 155 and 156 is pivotally mounted upon the bearings 173, (Fig. 4), of the lower feed roll 155 and is normally held in the position shown in Figs. 8 and 10 of the drawings by a latch 300 pivoted as at 301 to the frame 172, which latch engages with the side frame of the machine under tension of a spring 302. When it is desired to tilt the frame 172, the latch 300 carried by said frame is rotated in an anti-clockwise direction (Fig. 10) against the tension of its spring 302 and the frame 172 is then free to be rotated in a clockwise direction about its bearings 173 (Figs. 4 and 11) in which position of the frame the recording and punching devices may be inspected.

When the sales slip is fed by the secondary rolls 188 and 189 into position to receive the third impression, which impression is taken upon the original portion of the sales slip, that portion of the sales slip containing the first impression has passed through an opening 250 formed in a stationary knife 251 suitably supported by the frame work of the machine (Figs. 6 and 7), so that when a movable knife 252 is elevated, that portion of the slip containing the first impression will be severed from the remainder of the slip and deposited in the receptacle 253, (Fig. 4), located beneath the recording mechanism. This movable knife 252 is supported upon pins 254 projecting from arms 255 which are secured to a rock shaft 256. The movable knife 252 is furthermore held into contact with the station knife by springs 257 bearing against the outer edge of said movable knife which springs are seated in recesses formed in the heads of the arms 255, as shown in Figs. 6 and 7. Extending upwardly from the shaft 256 is an arm 258 which is connected by a link 259 to the lower end of a lever 260 which is loosely mounted upon the shaft 80. The upper end of this lever is provided with a roller 261 (Figs. 7 and 15), which roller plays in a cam groove 262 formed in the disk 244. The shape of this groove is such that approximately at the same time the third impression is taken upon the sales slip, the movable knife will be elevated to sever that portion of the sales slip containing the first impression. The severed portion of the slip is guided by a plate 264 (Fig. 4) which is secured to the stationary knife 251, into the receptacle 253. Coincidentally with the severing of the portion of the slip, an arm 265 projecting from the shaft 256 will, through a link 266, cause a plate 267 mounted in the receptacle to be inclined slightly rearwardly so as to deflect the severed portion of the slip toward the rear of the receptacle 253. The arm 265 carrying the link 266 is adjustably mounted upon the shaft 256 in order that the arm and link may be withdrawn from the receptacle when it is desired to remove the receptacle from the machine.

Having described in detail the various devices for performing the different functions of the invention, a résumé of the operation of the machine will now be given in order that the mind may be refreshed as to the functions performed by the machine. A clerk having made a sale, say for instance, a pair of gloves at $2 and two shirts at $3.98, an itemized sales slip of the transaction is transmitted with the goods to the cashier who inspects the goods and compares the same with the items listed on the sales slip, for the purpose of ascertaining whether the goods agree with the listed items and if they do, the cashier inserts the sales slip 144 in the receptacle 145 and depresses the keys of the machine corresponding to the clerk's number making the sale, the number of the station where the machine is located, the department in which the sale is made, and the keys representing the amount and kind of transaction. By the operation of the transaction key, the operating handle 6 is released. Upon the rotation of the crank handle 6 the driven members 29 will be differentially actuated in accordance with the keys depressed. The driven members 29 actuated under the control of the amount keys will, through the rack portions 35 of the links 34, Fig. 3, enter an amount upon the totalizer 38 corresponding to the amount represented by the keys depressed. This differential actuation of the driven members 29 will, as previously explained, rock the shafts 32 and will, through the arms 60 fast to certain ones of said shafts and links 61, adjust the amount and transaction type carriers 66 and 66ª, respectively. The rocking of the shafts 32 under control of the amount keys and the keys forming the composite number will, through arms 115 secured to said shafts, rods 116, bell cranks 117 and rods 119 adjust slides 120 carried in the movable frame 121 (Figs. 3, 4 and 7) directly above punches 723 mounted in the stationary frame 122 which punches correspond to the amount keys and the composite number set up on the keyboard. After the adjustment of the slides 120 relative to the punches 123, the frame 121 will be lowered by cam disk 141 secured to the operating shaft 11 and intermediate connections, whereby projections 142 of the adjusted slides 120 will contact with the selected plungers 123 and force the same through the sales slip 144 which has previously been positioned beneath the plungers 123. Plates 125 and 126 supported by links 124 extending downwardly from the movable frame 121 normally hold the plungers in the position as shown in Fig. 7 through the plate 126 contacting with the shoulders formed by notches 127 in said plungers. Upon the lowering of the frame 121 the plates 125 and 126 will also be lowered and the plungers will drop by gravity until arrested by the previously positioned sales slip. As the frame 121 continues to be lowered, the adjusted slides 120 through the projections 142 will force the selected plungers 123 through the sales slip. As the frame 121 is returned to its normal position by the cam disk 141, the plate 126 will engage the shoulders formed by the notches 127 in the plungers and restore said plungers to their normal position, as shown in Fig. 7.

The sales slip after being deposited upon the receptacle 145 is moved laterally by the flange 146 of a plate 147 secured to the underside of the receptacle 145, by the cam groove 168 (Fig. 4) formed in the disk 169 and intermediate connections, as best illustrated in Figs. 4, 5 and 8. This lateral movement of the sales slip by the plate 146 occurs at the very beginning of the operation of the machine and is sufficient to cause said sales slip to be gripped by the primary feed rollers 155 and 156 which rolls are then rotated through the segment lever 176 (Figs. 8 and 10) the latter being operated by a cam disk 184 secured to the rotation shaft 11 (Fig. 13). The sales slip is fed by these primary rolls 155 and 156 in position beneath the punches 123. Coincident with the positioning of the sales slip relative to the punches 123, the secondary feed roll 188 is elevated in engagement with its companion roll 189 by cam disk 203 secured to the main operating shaft 11 and intermediate connection, as shown in Figs. 7 and 15. This engagement of the secondary rolls 188 and 189 grips the sales slip and holds the same in position while it is being perforated by the punches 123. Simultaneously with the gripping of the sales slip by the secondary roll the primary roll 156 is elevated by the cam groove 205 formed in the surface of the disk 169 and the intermediate connection, as shown in Figs. 8, 10 and 11. Approximately simultaneously with the operation of the punching devices, the platen 227 is elevated by the lifting frame 230 to take an impression from the type carriers mounted upon the shaft 67 which frame is actuated by the cam disk 241 (Fig. 9) secured to the shaft 11 and the intermediate connections as best illustrated in Figs. 2, 4 and 9. Immediately after the taking of this impression and of the operation of the punch devices, the secondary rolls 188 and 189 are rotated by the segmental rack plate 218 (Figs. 2, 4 and 7) by which rotation the rolls 188 and 189 feeds the slip forwardly a short distance, after which the feed of the slip is momentarily arrested and a second impression is taken upon the sales slip from the type carriers by the platen 227. After this impression the slip is again fed forwardly and a third impression taken thereon from the type carriers by the platen 227. This third impression is taken upon the original portion of the sales slip at which time the part of the duplicate slip bearing the first impression has been fed through the stationary knife 229 and simultaneously with the taking of this third impression a movable knife 252 is operated to sever the portion of the sales slip extending through the stationary knife from the remainder of the slip, which severed portion passes into the forward compartment of the receptacle 253. The movable knife is carried by arms 255 secured to the shaft 256 and this shaft is rocked by a cam disk 244 (Fig. 15) and intermediate connections, as shown in Figs. 6, 7 and 15.

After the taking of the third impression upon the sales slip and the operation of the severing mechanism, the secondary rolls 188 and 189 are reversely rotated by the return of the segmental rack plate 218 to normal position, which reverse rotation of the rolls causes the slip to be fed rearwardly until it is brought into the position in which it is fed by the primary roll. At this time the primary roll 156 is lowered to grip the sales slip between the roll 156 and its companion roll 155 after which the secondary roll 158 is lowered out of engagement with its companion roll 189. The primary rolls are then reversely rotated by the return of actuating lever 176 therefor, which reverse rotation of said primary roll causes the sales slip to be fed into the receptacle 145 out of which it is taken and the original detached from the duplicate portion, the latter being wrapped with the goods and returned to the clerk making the sale, while the former is kept by the cashier and turned into the auditing department at the end of the day's business.

When the original portions of the sales slips are turned in to the auditing department by each cashier they are run through an auditing machine such for example as that shown in application Serial No. 723,205 filed Sept. 30, 1912, by the present applicant, and through the perforations in the sales slips symbolical of the clerks and departments select corresponding totalizers of the auditing machine, upon which are entered the amounts of the various sales represented by the perforated characters in the amount field of the sales slips.

After the sales slips of a particular cashier are run through the auditing machine described in the above mentioned application the various totalizers are cleared and the clerks and department totals automatically listed. This operation is repeated for each cashier so that after the sales slips of all of the cashiers have been run through the machine the totals of the various clerks and departments may be quickly ascertained. With the system at present in use these sales slips are first assorted into departments and then clerks and the totals of the departments and clerks' business are entered on an adding machine, whereas with the present invention by the use of a perforated sales slip the accumulations of the desired totals are automatically accomplished thereby avoiding the tedious and laborious work of manually assorting the sales slips and then entering the various sales upon an adding machine in order to ascertain the desired totals.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with primary rolls constructed to feed a sales slip in one direction, of secondary rolls constructed to feed the slip at right angles to its first direction of feed and then return the slip to the position to which it was fed by the primary rolls, and operating means for the primary and secondary rolls.

2. In a machine of the class described, the combination with primary and secondary rolls, of means for operating the primary rolls for the purpose of feeding a sales slip to the secondary rolls, and means for first gripping the slip between the secondary rolls and then operating the latter to feed the slip in a direction at right angles to which it is fed by the primary rolls.

3. In a machine of the class described, the combination with pairs of primary and secondary rolls arranged at right angles to each other, of means for alternately operating said rolls for the purpose of feeding a sales slip, and means for separating each pair of rolls while the other pair is feeding the sales slip.

4. In a machine of the class described, the combination with pairs of primary and secondary rolls arranged at right angles to each other, the primary pair of rolls being normally in operative condition while the secondary rolls are normally in inoperative condition, of means for operating the primary rolls for the purpose of feeding a sales slip to the secondary rolls and then rendering the primary rolls inoperative, and means for rendering the secondary rolls operative and then operating said secondary rolls.

5. In a machine of the class described, the combination with a sales slip receptacle, of pairs of primary and secondary rolls arranged at right angles to each other and means for feeding the sales slip from the receptacle to the pair of primary rolls and by the latter directly to the secondary rolls.

6. In a machine of the class described, the combination with a sales slip receptacle, of pairs of primary and secondary rolls arranged at right angles to each other, and an operating mechanism constructed first to deliver the sales slip from the receptacle to the primary rolls and from the latter to the secondary rolls and then reversing the operation whereby the sales slip will be delivered from the secondary rolls to the primary rolls and thence to the receptacle.

7. In a machine of the class described, the combination with devices for punching symbols out of a sales slip, of feed devices for the sales slip, and operating means for the feed devices constructed to feed the slip in one direction and then at right angles to said first direction to the punching devices and finally back again to normal position.

8. In a machine of the class described, the combination with primary rolls constructed to feed a sales slip in one direction and directly to secondary rolls, of secondary rolls constructed to feed the slip at right angles to its first direction of feed, and independent operating devices for operating each pair of feed rolls at different times.

9. In a machine of the class described, the combination with a sales slip receptacle, of feed rollers for the sales slip, devices for punching symbols out of the sales slip, and means for delivering the slip from the receptacle to the feed rollers while the rollers are inoperative and then actuating the latter to feed the slip into coöperative relation with the punching devices.

10. In a machine of the class described, the combination with a sales slip receptacle, of a pair of feed rollers for the slip, devices for punching symbols out of the sales slip, and an operating mechanism and connections for delivering the slip from the receptacle to the rollers and then feeding it into coöperative relation with the punching devices, operating the latter devices and finally feeding the slip by the rollers back into the receptacle.

11. In a machine of the class described, the combination with a sales slip receptacle, of a pair of feed rollers for the slip, devices for punching symbols out of the sales slip, means for delivering the slip from the receptacle to the rollers and then feeding it by the latter into coöperative relation with the punching devices, and means for operating the latter devices, after which the slip is fed by the rollers back into the receptacle.

12. In a machine of the class described, the combination with type carriers, of primary rolls for feeding a sales slip to the type carriers, means for taking an impression upon the sales slip from the type carriers, and secondary rolls for feeding the slip at right angles to the direction it is fed by the primary rolls whereby the sales slip may receive another impression from the type carriers and then for feeding the slip to the position to which it was fed by the primary rolls which finally feeds the slip in the direction reverse to that in which it was fed by the primary rolls to the type carriers.

13. In a machine of the class described, the combination with devices for punching symbols out of a sales slip, of means for recording data upon the sales slip corresponding to the symbols punched out of said slip, and means for feeding the slip in one direction to the punching devices and in another direction to the recording means and then back to normal position.

14. In a machine of the class described, the combination with devices for punching symbols out of a sales slip, of means for recording data upon the symbols punched out of said slip, primary and secondary feed rolls arranged at right angles, and means for alternately operating the feed rolls for feeding the slip to the punching devices and the recording means.

15. In a machine of the class described, the combination with devices for punching symbols out of a sales slip, of means for recording data upon the sales slip corresponding to the symbols punched out of said slip, primary and secondary feed rolls arranged at right angles, and means for first operating the primary feed rolls to feed the slip to the punching devices and then operating secondary rolls to feed the slip to the recording means.

16. In a machine of the class described, the combination with devices for punching symbols out of a sales slip, of means for recording data upon the sales slip corresponding to the symbols punched out of said slip, primary and secondary feed rolls arranged at right angles, the primary rolls being normally in operative condition and the secondary rolls normally in inoperative condition, means for first operating the primary feed rolls to feed the slip to the punching devices and then disabling said feed rolls, and means for enabling and operating the secondary rolls for feeding the slip to the recording means.

17. In a machine of the class described, the combination with devices for punching symbols out of a sales slip, of means for recording data upon the sales slip corresponding to the symbols punched out of said slip, primary and secondary feed rolls arranged at right angles, means for alternately operating the feed rolls for feeding the slip to the punching devices and the recording means, mechanism for taking a plurality of impressions upon the sales slip from the recording means, and means for severing a portion of the slip containing one of the impressions.

18. In a machine of the class described, the combination with devices for punching symbols out of a sales slip, of means for recording data upon the sales slip corresponding to the symbols punched out of said slip, primary and secondary feed rolls arranged at right angles, means for actuating the primary rolls for feeding the slip to the punching devices, means for actuating the secondary rolls for feeding the slip to the recording means, mechanism for taking a plurality of impressions upon the sales slip from the recording means, and means for severing a portion of the slip containing one of the impressions.

19. In a machine of the class described, the combination with devices for punching symbols out of a sales slip, of means for recording data upon the sales slip corresponding to the symbols punched out of said slip, primary and secondary feed rolls arranged at right angles, means for actuating the primary rolls for feeding the slip to the punching devices, means for actuating the secondary rolls for feeding the slip to the recording means, mechanism for taking a plurality of impressions upon the sales slip from the recording means, and means for severing a portion of the slip containing one of the impressions.

20. In a machine of the class described, the combination with a sales slip receptacle, of devices for punching symbols out of a sales slip, means for recording data upon the sales slip corresponding to the symbols punched out of said slip, and means for feeding the slip from the receptacle to the punching devices and the recording means and then back to the receptacle.

21. In a machine of the class described, the combination with a sales slip receptacle, of devices for punching symbols out of a sales slip, means for recording data upon the sales slip corresponding to the symbols punched out of said slip, rolls for feeding the slip to the punching devices and the recording means, and means for delivering the slip from the receptacle to the feed rolls, the rolls and said means being constructed to deliver the slip back to the receptacle.

22. In a machine of the class described, the combination with type carriers, of primary rolls for feeding a sales slip laterally to the type carriers, means for taking an impression upon the sales slip from the type carriers after the slip has been fed by the primary rolls, and secondary rolls to which the slip is fed directly by the primary rolls, for intermittently feeding the slip forwardly to receive other impressions from the type carriers.

23. In a machine of the class described, the combination with a sales slip receptacle, of devices for punching symbols out of a sales slip, means for recording data upon the sales slip corresponding to the symbols punched out of said slip, feeding rolls for the sales slip arranged at right angles, means for delivering the sales slip from the receptacle to the feeding rolls, and means for alternately operating the feed rolls whereby the sales slip will be fed in one direction to the punching devices and in another direction to the recording means.

24. In a machine of the class described, the combination with a sales slip receptacle, of devices for punching symbols out of a sales slip, means for recording data upon the sales slip corresponding to the symbols punched out of said slip, and feeding means for the sales slip constructed to feed the slip from the receptacle to the punching devices, thence to the recording means and finally back to the slip receptacle.

25. In a machine of the class described, the combination with a sales slip receptacle, of devices for punching symbols out of the sales slip, means for recording data upon the sales slip corresponding to the symbols punched out of said slip, feeding rolls arranged at right angles, means for delivering the slip to the feeding rolls, and means for so actuating the rolls as to feed the slip in one direction to the punching devices, thence in another direction to the recording means and finally back to the slip receptacle.

26. In a machine of the class described, the combination with a sales slip receptacle, of devices for punching symbols out of the sales slip, means for recording data upon the sales slip corresponding to the symbols punched out of said slip, primary and secondary feed rolls arranged at right angles, means for delivering the sales slip from the receptacle to the primary rolls, and actuating means for the primary and secondary rolls constructed to feed the slip by the primary rolls to the punching devices and by the secondary rolls to the recording means, then returning the slip to the receptacle by reversely rotating the secondary and primary rolls.

27. In a machine of the class described, the combination with devices for punching symbols out of a sales slip, of means for recording data upon the sales slip corresponding to the symbols punched out of the slip, primary and secondary feed rolls arranged to feed the sales slip to the punching devices and the recording means, a totalizer differential mechanism therefor, and an operating mechanism for actuating the totalizer by the differential mechanism and also actuating the punching devices and the recording means whereby there will be recorded upon and punched out of the sales slip an amount corresponding to that entered upon the totalizer.

28. In a machine of the class described, the combination with devices for punching symbols out of a sales slip, of means for recording data upon the sales slip corresponding to the symbols punched out of the slip, primary rolls and actuating means therefor arranged to feed the slip to the punching devices, secondary rolls and actuating means therefor arranged to feed the slip to the recording means at right angles to the direction in which it is fed by the primary rolls, a totalizer, differential mechanism therefor, and an operating mechanism for actuating the totalizer by the differential mechanism and also actuating the punching devices and the recording means whereby there will be recorded upon and punched out of the sales slip an amount corresponding to that entered upon the totalizer.

29. In a machine of the class described, the combination with type carriers, of primary rolls for feeding a sales slip to the type carriers, means for taking an impression upon the sales slip from the type carriers and secondary rolls for feeding the slip at right angles to the direction it is fed by the primary rolls whereby the sales slip may receive another impression from the type carriers.

30. In a machine of the class described, the combination with type carriers, of primary rolls for feeding a sales slip laterally to the type carriers, means for taking an impression upon the sales slip from the type carriers after the slip has been fed by the primary rolls, and secondary rolls for feeding the slip forwardly to receive other impressions from the type carriers.

31. In a machine of the class described, the combination with type carriers, of a pair of feed rolls and actuating mechanism therefor for feeding a sales slip comprising an original and a duplicate to the type carriers, means for taking an impression upon the duplicate portion of the sales slip from the type carriers after the slip has been fed by the aforesaid rolls, a second pair of feed rolls for intermittently feeding the slip at right angles to its first direction of feed by the first pair of rolls, the said impression means being actuated during the momentary rest of the sales slip for the purpose of recording upon the duplicate and original portions of the slip, and means for severing that portion of slip containing the first impression taken from the type carriers.

In testimony whereof I affix my signature in the presence of two witnesses.

FRED M. CARROLL.

Witnesses:
 R. C. GLASS,
 CARL BEUST.

Copies of this patent may be obtained for five cents each, by addressing the "Commissioner of Patents, Washington, D. C."